Figure 1:
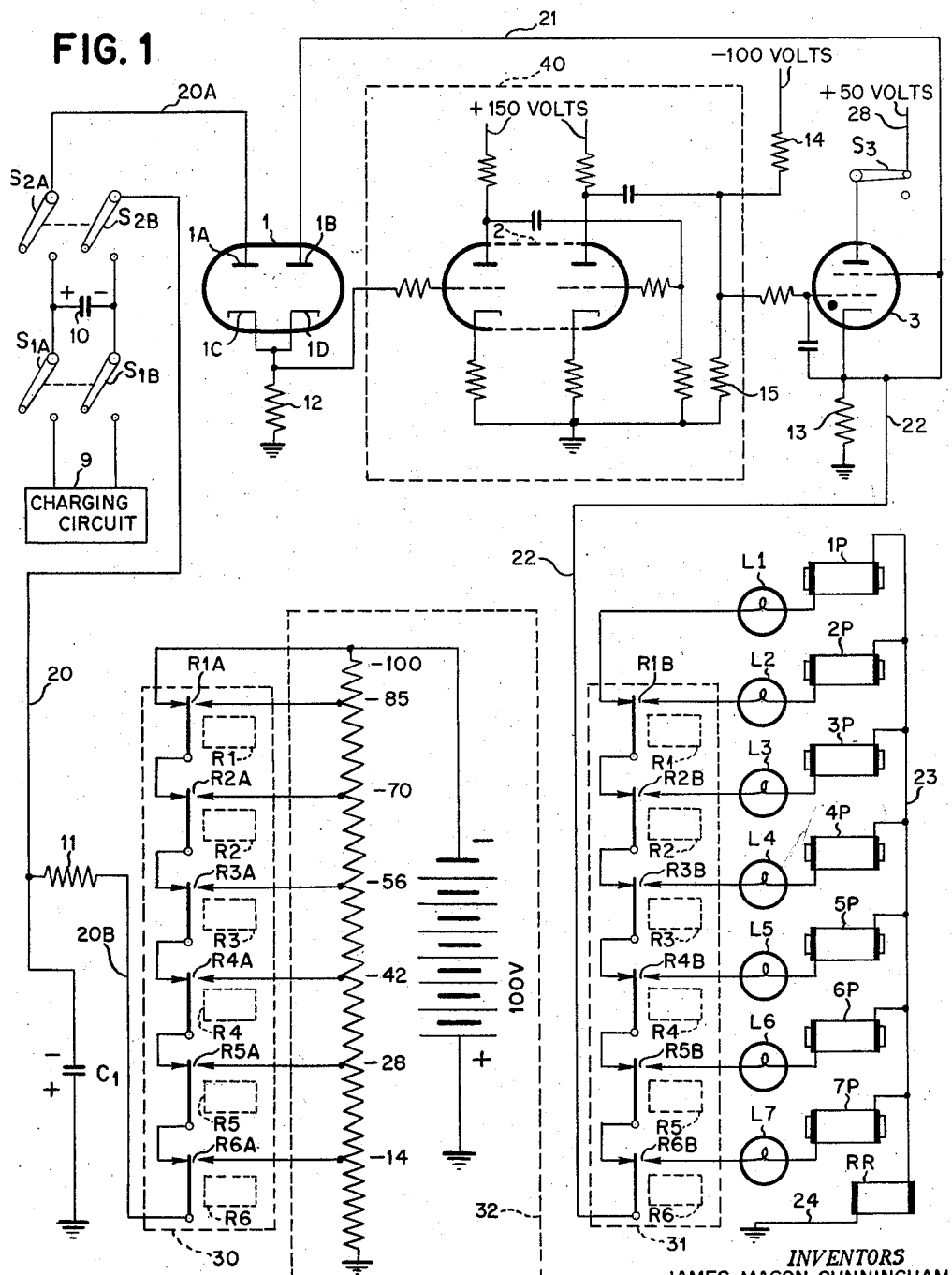

July 15, 1958  J. M. CUNNINGHAM ET AL  2,843,839
CLASSIFICATION CIRCUIT
Filed June 19, 1953  2 Sheets-Sheet 1

INVENTORS
JAMES MASON CUNNINGHAM
DONALD R. DAYKIN
BY Wesley De Bruin

July 15, 1958
J. M. CUNNINGHAM ET AL
2,843,839
CLASSIFICATION CIRCUIT
Filed June 19, 1953
2 Sheets-Sheet 2

INVENTORS
JAMES MASON CUNNINGHAM
DONALD R. DAYKIN
BY
Wesley De Bruin

United States Patent Office 2,843,839
Patented July 15, 1958

2,843,839

CLASSIFICATION CIRCUIT

James Mason Cunningham, Endicott, and Donald R. Daykin, Endwell, N. Y., assignors to International Business Machines Corporation, New York, N. Y., a corporation of New York Application June 19, 1953, Serial No. 362,906

7 Claims. (Cl. 340—172)

The present invention pertains to an electronic circuit which is suitable for use in determining the presence, and/or measuring the amount of electrical potential stored in an element without appreciably decreasing the amount of electrical energy stored therein.

Circuits of the class hereinafter described find wide application in measuring, weighing and testing devices. Devices of this nature include: vacuum tube volemeters; equipment for classifying vehicles, or the respective axles thereof, into various predetermined weight groups; and also strain measuring and recording apparatus, as disclosed in United States Patent No. 2,416,090, issued to A. V. De Forest on February 18, 1947.

The primary object of the present invention is to provide an electronic circuit having a small number of inexpensive components which will rapidly and accurately determine the charge on a capacitively reactive element without appreciably discharging said element.

Another object of the present invention is to provide an electronic circuit which will measure or determine the voltage existing across an element connected into a circuit independent of the circuit disclosed hereinafter, without appreciably loading the independent circuit.

In an embodiment wherein the present invention is utilized in a device for the classification of motor vehicles, or the respective axles thereof, into various weight groups, the potential in volts existing across the capacitively reactive element is related in a known manner to the weight of the vehicle, or to the weight on respective axles thereof, as the case may be.

Other objects of the invention will be pointed out in the following description and claims and illustrated in the accompanying drawing, which discloses, by way of example, the principle of the invention and the best mode which has been contemplated of applying that principle.

While the present invention may be embodied in various forms of apparatus having different appearance, for illustrative purpose, but with no intent to unduly limit the scope or application of the invention, it is herein shown in a very simplified form.

In the drawing:

Fig. 1 discloses a circuit embodying the invention.

Figure 2:
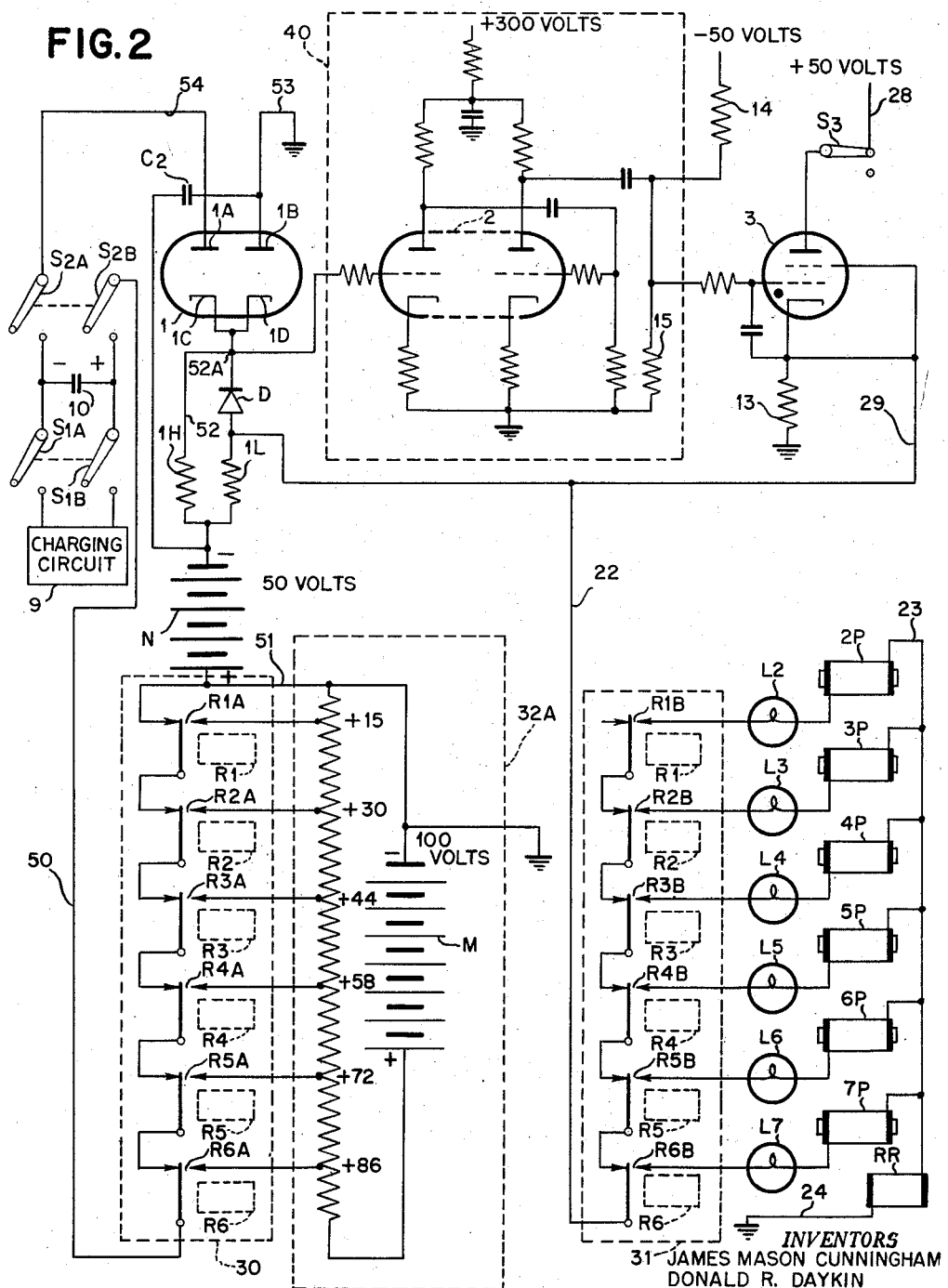

Fig. 2 discloses a circuit employing an alternative embodiment of the invention.

A description of the circuit of Fig. 1 is as follows: Referring to the drawing, electron discharge devices 1, 2 and 3 may be respectively of the following types; (twin diode) 6AL5, (twin triode) 12AX7 and a (thyratron) 2D21. A capacitively reactive element, shown as capacitor 10, is connectable through switch $S_{1A}$—$S_{1B}$ to charging circuit 9. The charging circuit 9 is shown only in block diagram form as it may take any of a variety of forms or embodiments well known in the art and it is not a part of the invention herein disclosed. Switches $S_{1A}$—$S_{1B}$ and $S_{2A}$—$S_{2B}$ are shown as being of the double pole single throw (knife) type; however, it is to be pointed out that they may be of any suitable type, e. g., electronic, mercury, relay contacts. For example; switches $S_{1A}$—$S_{1B}$ and $S_{2A}$—$S_{2B}$ may be of the type disclosed in United States Patent No. 1,052,920, issued to H. D. Hinckley on February 11, 1913.

The circuitry enclosed within broken lines 30 and 31, respectively, may be any type of first stepping switch and second stepping switch which are synchronized. For example, a synchronized pair of electromagnetic step by step switches of the type disclosed in United States Patent No. 2,531,882, issued to C. I. Johnson et al. on November 28, 1950, could be used. In the embodiment disclosed the stepping switches are stepping circuits each consisting of a plurality of interconnected relay contacts. The transfer contact of contacts $R_{1A}$, circuit 30, and the transfer contact of contacts $R_{1B}$, circuit 31, are actuated by relay coil $R_1$, not shown. The transfer contacts of contacts $R_{2A}$ and $R_{2B}$ are actuated by relay coil $R_2$, not shown. In like manner relay coils $R_3$, $R_4$, $R_5$ and $R_6$, not shown, respectively actuate contacts $R_{3A}$, $R_{3B}$:$R_{4A}$, $R_{4B}$:$R_{5A}$, $R_{5B}$:and $R_{6A}$, $R_{6B}$. Circuits for sequentially energizing relay coils $R_1$ through $R_6$ and thereby sequentially actuating (i. e. transferring) their respective contacts are well known in the art and thus need not be described.

The circuitry enclosed within broken line 40 is a twin triode connected as a resistance-capacitance coupled amplifier. Since amplifiers of this type are well known no further description is necessary. However, it is to be pointed out that the amplifier need not necessarily be of the resistance-capacitance coupled type, but could be any one or more of a variety of types well known in the art.

The circuitry within broken line 32 is a source of tapped direct current potential shown in the form of a potentiometer. The potentiometer has a plurality of taps of decreasing negative potential, connected, respectively, in the order recited each to a normally open contact of contacts $R_{1A}$, $R_{2A}$, $R_{3A}$, $R_{4A}$, $R_{5A}$ and $R_{6A}$. It is to be noted that the normally closed contact of contacts $R_{1A}$ is connected to the negative terminal of the direct current source.

Indicators $L_1$ through $L_7$, shown as lamps, are each connected in series with its respective print magnet, 1P through 7P. Each print magnet when energized actuates a printing mechanism (not shown) for printing a character or number peculiar to the energized print magnet. Printing mechanisms of this type are well known. It is to be understood that the printing mechanism could be replaced by, or combined with, a similarly operated record-card punch.

The circuit of Fig. 1 operates in the following manner: Upon the closing of switch $S_{2A}$—$S_{2B}$ a circuit is completed from anode 1A of the twin diode through lead 20A, switch blade $S_{2A}$, capacitive reactance 10, switch blade $S_{2B}$, lead 20 and capacitor $C_1$ to ground. Connected in parallel with capacitor $C_1$ is the series circuit of resistor 11 and stepping switch 30. The stepping switch 30 has its normally open contacts connected to taps on the potentiometer 32 as clearly shown and discussed earlier. It is seen that initially the potential across $C_1$ is negative 100 volts with respect to ground. Cathode 1C of the twin diode 1 is connected through resistor 12 to ground.

Attempting to render conductive diode 1A—1C of twin diode 1: It is apparent from an inspection of Fig. 1 that when diode 1A—1C is non-conductive the potential across it (when switch $S_{2A}$—$S_{2B}$ is closed) is the algebraic sum of the potentials existing across capacitive reactance 10 and capacitor $C_1$. Now, noting the polarity of the potentials on capacitive reactance 10 and capacitor $C_1$ respectively, it is seen that if the potential across element 10 sufficiently exceeds the potential across $C_1$, then diode 1A—1C will be rendered conductive.

*Example.*—The charge, expressed in volts, existing across element 10 is assumed for purposes of explanation to be 69 volts with the polarity as shown in Fig. 1. Then at the instant switch $S_{2A}$—$S_{2B}$ is closed the voltage across diode 1A—1C will be (—100+69) or —31 volts and the diode will not be rendered conductive. The stepping switches 30 and 31 are so synchronized with the closing of switch $S_{2A}$—$S_{2B}$, by means not shown, as to successively energize relay coils $R_1$, $R_2$, $R_3$, $R_4$, $R_5$ and $R_6$. As pointed out earlier each relay coil when energized actuates its transfer contact in each of the two stepping switches 30 and 31. Therefore, a very short interval of time after switch $S_{2A}$—$S_{2B}$ is closed and diode 1A—1C has remained non-conductive, relay coil $R_1$ is energized. This results in the normally closed contacts of contacts $R_{1A}$ and $R_{1B}$ opening and the normally open contacts of contacts $R_{1A}$ and $R_{1B}$ closing. The closing of the normally open contact of contacts $R_{1A}$ reduces the charge, expressed in volts, on $C_1$ to —85 volts. Diode 1A—1C, however, remains non-conductive since the potential across it is now (+69—85) or —16 volts. A very short interval of time later relay coil $R_2$ is energized which results in opening the normally closed contacts of contacts $R_{2A}$ and $R_{2B}$ and closing the normally open contacts of contacts $R_{2A}$ and $R_{2B}$. The potential across diode 1A—1C, is now (+69—70) or —1 volt and hence the diode remains non-conductive. Subsequently, when relay coil $R_3$ is energized the potential across diode 1A—1C will be (+69—56) or +13 volts. This renders diode 1A—1C conductive.

Rendering diode 1A—1C of Fig. 1 non-conductive: Through proper choice of circuit constants and in particular the resistance value of resistor 12, the voltage drop across resistor 12 (when diode 1A—1C is conductive) amplified by amplifier 40 and impressed upon the control grid of thyratron 3 renders said thyratron tube conductive. That is the normal bias (see potentiometer formed by resistors 14 and 15) on the control grid of gas tube 3 is overcome by amplifying the increment of potential existing across resistor 12 and superimposing it on the control grid of thyratron 3. It is seen that lead 21 connects the cathode of tube 3 to anode 1B of twin diode 1. Cathodes 1C and 1D are connected together and through resistor 12 to ground. As will be apparent a judicious choice as to the resistance value of resistor 12 is further necessary in order that the potential drop across resistor 12 as a result of the firing of gas tube 3 is sufficient to render diode 1A—1C non-conductive. It is seen from Fig. 1 (see lead 21) that anode 1B is always substantially at the potential of the cathode of tube 3. When tube 3 is fired this potential is approximately +50 volts less the drop across tube 3. This potential is more than sufficient to render diode 1B—1D conductive. The increment of potential dropped across resistor 12 as a result of diode 1B—1D conducting raises the potential of cathode 1C sufficiently to render non-conductive diode 1A—1C; thus stopping the discharge of capacitive reactance 10.

Since diode 1A—1C is rendered conductive and non-conductive practically instantaneously by the sequence of operation set forth above, the element 10 is not appreciably discharged; thereby allowing repeated classification as hereinafter more fully explained.

*Classification.*—Referring again to Fig. 1, it is to be kept in mind that stepping switches 30 and 31 are synchronized as explained earlier. Hence if, as in the example recited above, diode 1A—1C is rendered conductive when the transfer contacts of contacts $R_{3A}$ and $R_{3B}$ are actuated (i. e. transferred), then the firing of tube 3 completes an additional circuit. The additional circuit completed is from a +50 volt source through (normally closed) switch $S_3$, tube 3, lead 22, normally closed contacts $R_{6B}$, $R_{5B}$ and $R_{4B}$, the now closed (normally open) contact of contacts $R_{3B}$, lamp $L_4$, print magnet 4P, lead 23, relay coil RR, and lead 24 to ground.

The indicator lamp $L_4$ gives a visual representation of the classification and print magnet 4P and its associated mechanism a recorded representation of the classification.

The function of relay coil RR is the actuation of a contact, not shown, in the control circuit of stepping switches 30 and 31 to cease the stepping action of said switches for the instant cycle of operation when relay coil RR has been energized. A means, not shown, but well known to anyone skilled in the art, is provided for opening switch $S_{2A}$—$S_{2B}$ when relay coil RR has been energized.

A brief summary of the operation of the circuit of Fig. 1 is as follows: When switch $S_{2A}$—$S_{2B}$ is closed the algebraic sum of the potential existing across element 10 and capacitor $C_1$ is impressed across diode 1A—1C. Stepping switch 30 successively decreases the negative potential on capacitor $C_1$ until diode 1A—1C is rendered conductive.

When diode 1A—1C is rendered conductive the voltage drop across resistor 12 is amplified and superimposed on the control grid of thyratron 3 to fire said thyratron.

When thyratron 3 fires it completes two circuits, one of which is through lead 21, diode 1B—1D and resistor 12 to ground. As a result of this circuit being completed, the potential drop across resistor 12 is increased to such an amount to cut-off diode 1A—1C. The other circuit completed by firing tube 3 is through lead 22, the particular step in stepping circuit 31, the particular indicating lamp and print magnet, lead 23, relay coil RR, and lead 24 to ground. Energization of reset relay coil RR, through means not shown, opens switch $S_{2A}$—$S_{2B}$. In addition, energization of relay coil RR, actuates a contact, not shown, in the control circuit of stepping switches 30 and 31.

Thus visual classification by a particular indicator lamp and recorded classification by a particular print magnet are accomplished.

Before the next cycle of operation switch $S_3$ is momentarily opened to extinguish thyratron 3 and thereby deenergize the indicator lamp and print magnet selected in the previous cycle.

*Description and mode of operation of an alternative embodiment of the invention as shown in Fig. 2*

In Figs. 1 and 2 like parts are indicated by like characters of reference.

A description of the circuit of Fig. 2 is as follows: Electron discharge devices 1, 2 and 3 may be respectively of the following types (twin diode) 6AL5, (twin triode) 12AX7, and a (thyratron) 2D21. A capacitively reactive element, shown as capacitor 10, is connectable through switch $S_{1A}$—$S_{1B}$ to charging circuit 9. The charging circuit 9 is shown only in block diagram form as it may take any of a variety of forms or embodiments well known in the art and it is not a part of the invention herein disclosed. Switches $S_{1A}$—$S_{1B}$ and $S_{2A}$—$S_{2B}$ are shown as being of a double pole single throw (knife) type; however, as was pointed out with respect to Fig. 1 they may be of any suitable type.

The circuitry enclosed within broken lines 30 and 31, respectively, may be any type of first stepping switch and second stepping switch which are synchronized. In the embodiment disclosed the stepping switches are stepping circuits each consisting of a plurality of interconnected relay contacts. The transfer contact of contacts $R_{1A}$, circuit 30, and the transfer contact of contacts $R_{1B}$, circuit 31 are actuated by relay coil $R_1$, not shown. The transfer contacts of contacts $R_{2A}$ and $R_{2B}$ are actuated by relay coil $R_2$, not shown. In like manner relay coils $R_3$, $R_4$, $R_5$ and $R_6$, not shown, respectively actuate contacts $R_{3A}$, $R_{3B}$:$R_{4A}$, $R_{4B}$:$R_{5A}$, $R_{5B}$:and $R_{6A}$, $R_{6B}$. Circuits for sequentially energizing relay coils $R_1$ through $R_6$ and thereby sequentially actuating (i. e. transferring) their respective contacts are well known in the art.

The circuitry enclosed within broken line 40 is a twin triode connected as a resistance-capacitance coupled amplifier. Any one or more of a variety of types of amplifiers well known in the art could be used.

The circuitry within broken line 32A (Fig. 2) is a source of tapped direct current potential shown in the form of a potentiometer. The potentiometer has a plurality of taps of increasing positive potential connected, respectively, in the order recited, each to a normally open contact of contacts $R_{1A}$, $R_{2A}$, $R_{3A}$, $R_{4A}$, $R_{5A}$ and $R_{6A}$. The normally closed contact of contacts $R_{1A}$ is connected via lead 51 to ground.

Indicators $L_2$ through $L_7$, shown as lamps, are each connected in series with its respective print magnet, 2P through 7P. Each print magnet when energized actuates a printing mechanism (not shown) for printing a character or number peculiar to the energized print magnet. The printing mechanism could be replaced by, or combined with, a record-card punch.

The circuit of Fig. 2 operates in the following manner: It is apparent from an inspection of Fig. 2 that in the embodiment of the invention disclosed in this figure diode 1B—1D is normally conductive as a result of the following closed circuit: cathode 1D, lead 52, resistor 1H, the negative (—) terminal of direct current source N, D. C. source N, the positive (+) terminal of D. C. source N, lead 51, to ground, and grounded lead 53 to anode 1B. D. C. source N has a potential of approximately 50 volts. The potential drop across resistor 1H is very nearly equal to the potential supplied by D. C. source N. Thus commonly connected cathodes 1C and 1D are at very nearly ground potential when diode 1B—1D is conductive. It will be seen from Fig. 2 that diode D and resistor 1L are serially connected and shunt resistor 1H. It is apparent from Fig. 2 that diode D offers a very high resistance to current flow from cathodes 1C and 1D to D. C. source N; and very little resistance to current flow in the opposite direction.

*Example.*—Let it be assumed for purpose of explanation that the charge, expressed in volts, existing across element 10 is 52 volts with the polarity as shown in Fig. 2. Then at the instant switch $S_{2A}$—$S_{2B}$ is closed the voltage across diode 1A—1C will be approximately —52 volts and hence said diode will not be rendered conductive. The stepping switches 30 and 31 are so synchronized with the closing of switch $S_{2A}$—$S_{2B}$, by means not shown, as to successively energize relay coils $R_1$, $R_2$, $R_3$, $R_4$, $R_5$ and $R_6$. As pointed out earlier, each relay coil when energized actuates a transfer contact in each of the two stepping switches 30 and 31. Therefore, a very short interval of time after switch $S_{2A}$—$S_{2B}$ is closed and diode 1A—1C has remained non-conductive, relay coil $R_1$ is energized. This results in the normally closed contacts of contacts $R_{1A}$ and $R_{1B}$ opening and the normally open contacts of contacts $R_{1A}$ and $R_{1B}$ closing. The closing of the normally open contact of contacts $R_{1A}$ reduces the voltage impressed across diode 1A—1C to approximately —37 volts (—52+15); said diode, however, remaining non-conductive. Subsequently, relay coil $R_2$ is energized which results in opening the normally closed contacts of contacts $R_{2A}$ and $R_{2B}$ and closing normally open contacts of contacts $R_{2A}$ and $R_{2B}$. The potential across diode 1A—1C, which remains non-conductive, is now approximately —22 volts (—52+30). Subsequently, when relay coil $R_3$ is energized the potential across diode 1A—1C, said diode remaining non-conductive, is approximately —8 volts (i. e. —52+44). When subsequently relay coil $R_4$ is energized, diode 1A—1C is rendered conductive since approximately +6 volts (+58—52) is impressed across said diode. The circuit which is completed is as follows: Cathode 1C, lead 52, resistor 1H, direct-current source N, lead 51 to ground; the +58 volt tap on potentiometer 32A, the now closed (normally open) contacts $R_{4A}$, normally closed contact $R_{5A}$, normally closed contact $R_{6A}$, lead 50, switch blade $S_{2B}$, capacitor 10, switch blade $S_{2A}$, and lead 54 to anode 1A.

When diode 1A—1C is rendered conductive the potential drop across resistor 1H increases and the potential at junction 52A rises. A positive pulse from junction 52A is fed to and amplified by amplifier 40. The amplified positive pulse from amplifier 40 is impressed on the control grid of thyratron tube 3 to render said tube conductive. When thyratron tube 3 is rendered conductive the potential at junction 52A rises to approximately +42 volts as a result of the following circuit: the positive terminal of a 50 volt source (not shown), lead 28, switch S3 (controlled through means not shown by relay RR) thyratron tube 3, lead 29, diode D, resistor 1H, direct-current source N, and lead 51 to ground.

When thyratron tube 3 is conductive, resulting in junction 52A being at approximately +42 volts, diode 1A—1C of twin diode 1 is rendered non-conductive, since its cathode 1C is at the increased positive potential of approximately +42 volts.

Since diode 1A—1C is rendered conductive and non-conductive practically instantaneously by the sequence of operation set forth above, element 10 is not appreciably discharged; thereby permitting repeated classification.

Classification is accomplished in the following manner: Still referring to Fig. 2 it is to be kept in mind that stepping switches 30 and 31 are synchronized. Hence if, as in the example recited above, diode 1A—1C is rendered conductive when the transfer contacts of contacts $R_{4A}$ and $R_{4B}$ are actuated (i. e. transferred) then the firing of tube 3 completes also the following circuit: from the +terminal of a 50 volt source (not shown), lead 28, tube 3, lead 29, lead 22, the normally closed contacts of contacts $R_{6B}$ and $R_{5B}$, the now closed (normally open) contact of contacts $R_{4B}$, lamp $L_5$, print magnet 5P, lead 23, relay coil RR, and lead 24 to ground.

The indicator lamp $L_5$ gives a visual representation of the classification while print magnet 5P and its associated mechanism renders a recorded representation of the classification.

The functions of relay coil RR are the actuation of a contact, not shown, in the control circuit of stepping switches 30 and 31 to cease the stepping action of said switches for the instant cycle of operation when relay coil RR has been energized, and means not shown but actuated by said relay coil for opening switch $S_{2A}$—$S_{2B}$.

Before the next cycle of operation switch $S_3$ is momentarily opened to extinguish thyratron 3 and thereby de-energize the indicator lamp and print magnet selected in the previous cycle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a switching circuit of the class described, a first diode, a second diode, and an electron discharge device, said first and said second diodes having a common cathode circuit; the circuit of said first diode including a source of direct current potential for rendering said first diode conductive; the circuit of said second diode including feedback means connected between said electron discharge device and the anode of said second diode for rendering said second diode conductive in response to the conduction of said electron discharge device; and amplifier means interconnecting the common cathode circuit of said first and second diodes and said electron discharge device for rendering said electron discharge device conductive in response to the conduction of said first diode to thereby render said second diode conductive, whereupon the combined first and second diode current flow through the common cathode resistor renders said first diode non-conductive.

2. In an apparatus for measuring the electrical potential stored in an element, the combination of a switching circuit comprising a first diode, a second diode, means including said element for rendering said first diode conductive, a gas electron discharge device, means including amplifier means for igniting said electron discharge device in response to said first diode being rendered conductive, feedback means interconnecting said electron discharge device and said second diode for rendering said second diode conductive in response to said electron discharge device being rendered conductive, means so coupling said first and said second diodes that said first diode is rendered non-conductive consequent upon said second diode being rendered conductive, and means for maintaining said electron discharge device conductive so as to maintain said first diode non-conductive so that the electrical potential stored in said element is effective to cause the conduction of said first diode without appreciably dissipating the electrical potential stored in said element.

3. A voltage classifying circuit comprising a first electron discharge device, a second electron discharge device, said first and second electron discharge devices having a common cathode circuit, a circuit for said first electron discharge device including a first stepping switch for providing different values of potential from a suitable power source, an element having an electrical potential stored therein connected in series circuit with said first switch, a third electron discharge device, a circuit for said third electron discharge device including a voltage classification indicating apparatus having a plurality of class representing elements, a second stepping switch for conditioning for operation succeeding class representing elements, means coupling the common cathode circuit of said first and second electron discharge devices to said third device for rendering said third electron discharge device conductive in response to the conduction of said first electron discharge device, means for operating said first and said second stepping switches in a timed relationship one to the other whereupon a circuit is completed to a class representing element conditioned for operation and representative of the classification of the electrical potential stored in said element when said first device is rendered conductive consequent upon a predetermined relationship between the voltage provided by said first stepping switch and the electrical potential stored in said element, and a circuit of said second electron discharge device including a feedback means connected between said third electron discharge device and the anode of said second electron discharge device for rendering said second electron discharge device conductive in response to the conduction of said third electron discharge device whereupon the combined first and second electron discharge device current flow through the common cathode circuit renders said first electron discharge device non-conductive.

4. A voltage classifying circuit according to claim 3 additionally comprising reset means, and means controlled by said reset means for maintaining said third device conductive so as to maintain said first device non-conductive in order that the electrical potential stored in said element is effective to cause the conduction of said first device without appreciably changing the potential stored in said element.

5. A voltage classifying circuit comprising a diode having a resistor in the circuit thereof; an electron discharge device; a circuit of said diode including a voltage supply, and an element having an electrical potential stored therein; a circuit of said electron discharge device including a voltage classification indicating means which is operated in response to the conduction of said electron discharge device, and means coupling the cathode circuit of said diode to said electron discharge device for rendering said electron discharge device conductive in response to the conduction of said diode; and means for varying the magnitude of the output signal from said voltage supply in a step-by-step fashion so that said diode is rendered conductive in response to a predetermined voltage relationship between the output signal at one step and the electrical potential stored in said element, whereupon said electron discharge device is rendered conductive and said classification indicating means is operated as a result thereof to thereby indicate the classification of the potential stored in said element.

6. A voltage classifying circuit comprising a condenser having an electrical potential stored therein, a voltage supply connected in series circuit with said condenser, a first diode connected in series circuit with said condenser and said voltage supply, means for varying the magnitude of the voltage supply output signal in a step-by-step fashion so that said first diode is rendered conductive in response to a predetermined voltage relationship between the output signal at one step and the electrical potential stored in said condenser, classification indicating means operated in response to the conduction of said first diode for indicating the classification of the potential stored in said condenser, a second diode, electric circuit means connecting said first and said second diodes for rendering said second diode conductive in response to said first diode being rendered conductive, and other electrical circuit means so interconnecting said first and said second diodes as to render said first diode non-conductive consequent upon said second diode being rendered conductive, whereby the electrical potential stored in said condenser is determined without any appreciable dissipation thereof.

7. A voltage classifying circuit according to claim 6 additionally comprising means for maintaining said classified indicating means operated during the period said first diode is rendered non-conductive after having once been rendered conductive.

References Cited in the file of this patent

UNITED STATES PATENTS

| | | |
|---|---|---|
| Re. 22,794 | Deakin | Oct. 1, 1946 |
| 1,669,112 | Winter | May 8, 1928 |
| 2,410,821 | Hillman | Nov. 12, 1946 |
| 2,413,440 | Farrington | Dec. 31, 1946 |
| 2,468,687 | Schmitt | Apr. 26, 1949 |
| 2,490,243 | Tellier | Dec. 6, 1949 |
| 2,549,874 | Williams | Apr. 24, 1951 |
| 2,584,153 | Oberman | Feb. 5, 1952 |
| 2,604,589 | Burns | July 22, 1952 |
| 2,615,094 | Mitchell | Oct. 21, 1952 |
| 2,616,960 | Dell | Nov. 4, 1952 |